United States Patent [19]

SanGregory

[11] Patent Number: 5,373,341
[45] Date of Patent: Dec. 13, 1994

[54] LOCKOUT OVERRIDE FOR CAMERAS

[75] Inventor: Jude A. SanGregory, Spencerport, N.Y.

[73] Assignee: Eastman Kodak Company, Rochester, N.Y.

[21] Appl. No.: 121,323

[22] Filed: Aug. 31, 1993

[51] Int. Cl.5 .............................................. G03B 13/36
[52] U.S. Cl. ................................... 354/400; 354/418; 354/266; 354/268
[58] Field of Search ............... 354/400, 402, 418, 413, 354/127.1, 127.11, 127.12, 266, 268

[56] References Cited

U.S. PATENT DOCUMENTS

| 3,728,947 | 4/1973 | Harnden, Jr. et al. | 95/11.5 R |
| 3,938,165 | 2/1976 | Asano | 354/268 |
| 3,987,468 | 10/1976 | Matsuzaki et al. | 354/145 |
| 4,074,287 | 2/1978 | Iwata et al. | 354/31 |
| 4,074,290 | 2/1978 | Matsuzaki et al. | 354/34 |
| 4,155,029 | 5/1979 | Yamaoka | 315/151 |
| 4,231,645 | 11/1980 | Davis et al. | 354/145 |
| 4,239,361 | 12/1980 | Harvey | 354/145 |
| 4,361,389 | 11/1982 | Monks et al. | 354/139 |
| 4,431,286 | 2/1984 | Staller | 354/435 |

*Primary Examiner*—Russell E. Adams
*Attorney, Agent, or Firm*—Heslin & Rothenberg

[57] ABSTRACT

A camera with photo lockout when a lockout condition is present is overridden when the trigger switch is pressed a second time. For example, when the flash charger has not reached a predetermined minimum charge level, flash lockout occurs. As another example, when the photo subject is outside the range of an auto focus system, focus lockout occurs. In either situation, a second press of the trigger switch within a predetermined time period of the first press overrides the lockout. An optional lockout indicator, such as an L.E.D., may be added. In addition, lockout may still occur where an ambient light level reading indicates insufficient light for exposure.

22 Claims, 4 Drawing Sheets

LOCKOUT OVERRIDE FOR CAMERAS

BACKGROUND OF THE INVENTION

1. Technical Field

The present invention generally relates to cameras. More particularly, the present invention relates to cameras which prevent underexposed or improperly focused photographs from being taken.

2. Background Art

Many cameras today have features which help prevent or lockout underexposed and/or improperly focused photographs from being taken. Generally, when a predetermined lockout condition is present, the camera will not allow the user to take a photograph. One such feature, known as "flash lockout", prevents a photograph from being taken where a flash is necessary, until the flash charger has charged to an acceptable voltage. Another feature found on cameras with auto focus capability, known as "focus lockout", prevents a photograph from being taken when the subject to be photographed is outside the focusing range of the focusing mechanism.

Although these types of lockout features help reduce poor quality photographs, they also prevent photographs from being taken at times when even a poor quality photograph would be acceptable. When a rare or short-lived photo opportunity arises, a user may want to be able to take the photo even though a risk of, for example, underexposure or improper focusing may exist.

Thus, a need exists for a camera with a simple and efficient lockout override feature.

SUMMARY OF THE INVENTION

Briefly, the present invention satisfies the need for a simple and efficient lockout override feature by providing a camera capable of overriding one or more lockout features.

In one aspect of the present invention, a camera is provided with an electronic shutter mechanism including a shutter, means for initiating release of the shutter, a controller for controlling the release of the shutter, means for monitoring for and indicating to the controller the presence of a lockout condition, and means for overriding lockout. When the presence of the lockout condition is indicated, the controller will disregard activation of the initiating means. However, the means for overriding the lockout overrides the controller and causes release of the shutter.

In another aspect of the present invention, a method for overriding lockout in a camera having a lockout feature is provided. The camera includes an electronic shutter mechanism including a shutter, a shutter-release switch, and a controller for controlling release of the shutter. The shutter-release switch is closed in an attempt to take a photograph. Responding to a lockout condition, the controller locks out the shutter-release. Closing the shutter release switch a second time within a predetermined time of the first closure overrides the lockout, and the shutter is released.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
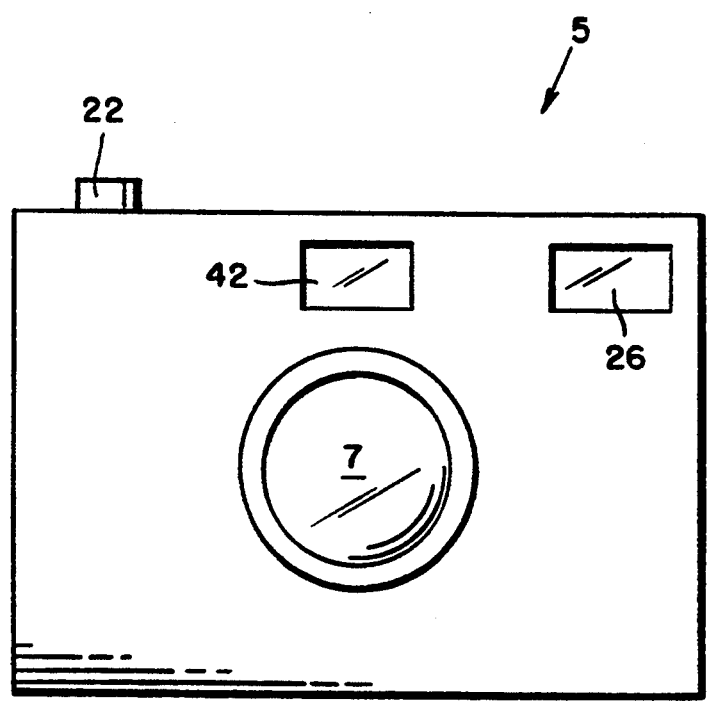
FIG. 1 depicts a camera with built-in flash and auto focus capabilities, as well as lockout override features according to the present invention.

FIG. 1 depicts a still camera 5 of usual construction which can be provided with lockout override according to the present invention. Camera 5 includes trigger switch 22, flash 26, viewfinder 42 and auto focus lens 7. When camera 5 is turned on, it automatically begins charging flash 26. Upon pressing switch 22, camera 5 determines whether a flash is necessary and the distance of a photographic subject from camera 5. If the flash has not yet charged to a minimum predetermined level providing optimum lighting, flash lockout will occur. In addition, if the distance of the subject is outside the focusing range of lens 7, focus lockout will occur. In either case (or both), the user will be unable to take a photograph immediately. Lockout override according to the present invention allows the user to override the lockout and take the photo even though optimum conditions may not exist.

Figure 2:
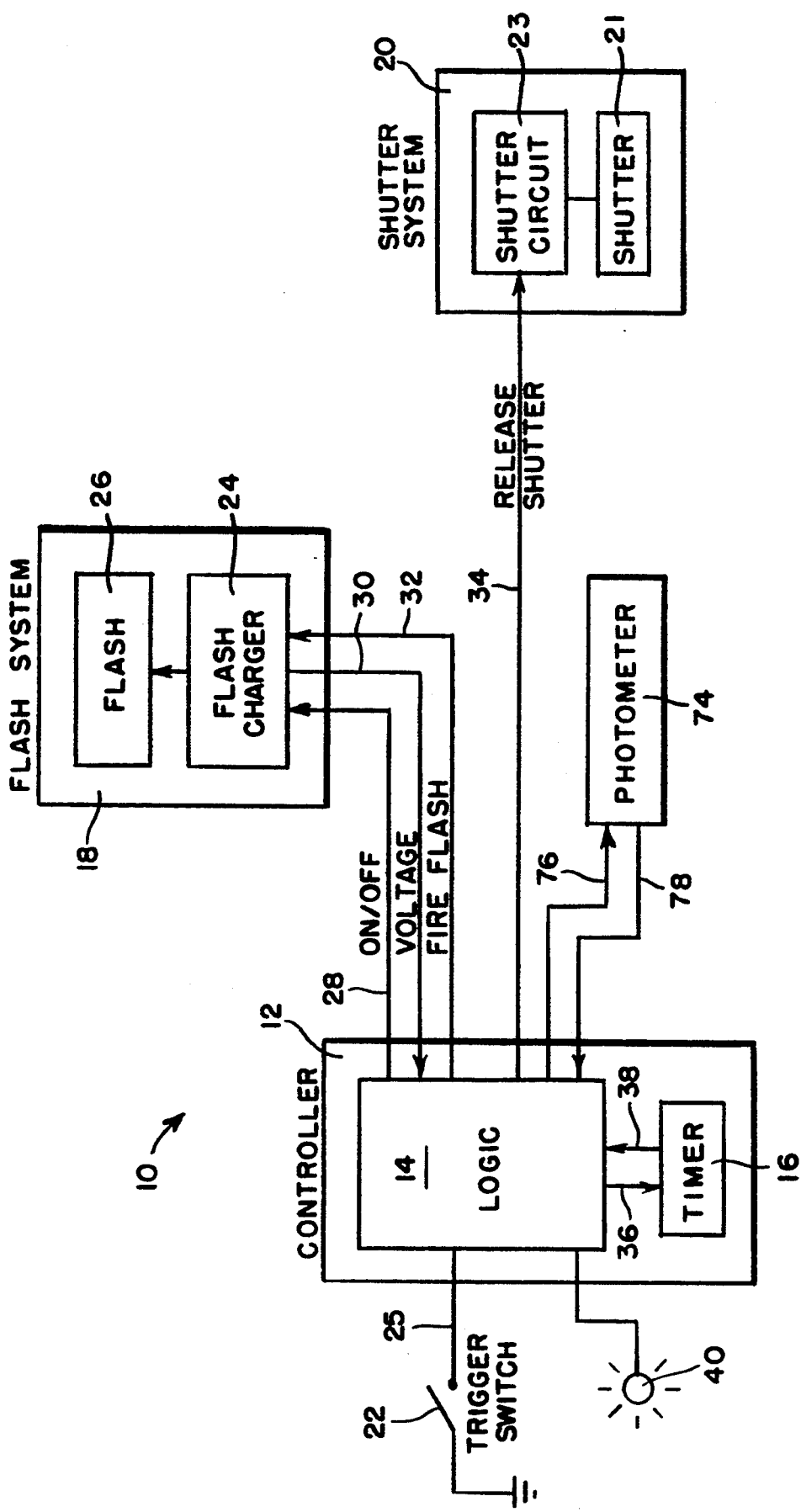
FIG. 2 is a block diagram representation of a portion of the camera of FIG. 1 with flash lockout override capability according to the present invention.

FIG. 2 depicts, in block diagram fashion, a portion 10 of camera 5 providing flash lockout override according to the present invention. Controller 12, comprising logic 14 and timer 16, controls flash system 18 and shutter system 20 in response to trigger switch 22 closing. Flash system 18 comprises flash charger 24 and flash 26. Photometer 74 provides controller 12 with light level information for use in determining whether flash 26 is necessary and for use in setting the exposure. Various control signals and messages which will subsequently be discussed in greater detail are exchanged between the components of portion 10 over lines 28, 30, 32, 34, 36, 38, 76 and 78.

When camera 5 is provided with a flash lockout feature, controller 12 would not cause flash 26 to fire or shutter 21 to release before flash charger 24 reaches a predetermined voltage. A description of the operation of flash lockout will now be provided with reference to camera portion 10. However, it will be understood that other camera designs could be used with the present invention; camera 5 and portion 10 are used as an example only.

When camera 5 is turned on or just after a photo has been taken, controller 12 sends a signal to flash charger 24 over line 28 to begin charging. Flash charger 24 could include, for example, a capacitor for storing charge. When flash charger 24 has reached a predetermined voltage, a signal is sent to the controller over line 30 indicating flash 26 is ready to be fired. If, for example, flash 26 comprised a xenon tube, the predetermined voltage would be approximately 270 volts, which is the voltage typically specified across xenon tubes for optimum lighting. As is known by those skilled in the art, xenon tubes also require a charge along them, as well as a voltage from end to end, the charge along them typically being thousands of volts and is obtained by providing appropriate windings in a transformer used to produce the voltage across the tube ends. The predetermined voltage could be detected by, for example, including a zener diode across the charging capacitor which begins conducting at the predetermined voltage, sending a signal to the controller. If trigger switch 22 is closed (i.e., a photograph is attempted) and controller 12 has decided that a flash will be necessary based on the light level reading of photometer 74, controller 12 checks to see if the flash charger has reached the predetermined voltage. If the predetermined voltage has been reached, controller 12 will send a fire signal to flash system 18 over line 32, and at the same time send a release signal to shutter system 20 over line 34. If the predetermined voltage has not yet been reached, controller 12 will not send the fire and release signals, i.e., controller 12 will lock out the flash photograph.

At the point when lockout has occurred, the user knows that no photo has been taken, since the normal sounds will not be heard and the film advance indicator (not shown) will not increment. Optionally, a separate lockout indicator could be included to inform the user that lockout has occurred. Such an indicator could be, for example, an LED 40 located somewhere on the exterior of camera 5 or it could be, as another example, internal and seen through viewfinder 42. Such an indicator would be especially useful to those having difficulty hearing the operation of camera 5 due to environmental noise or hearing loss.

In accordance with the principles of the present invention, camera 5 can be provided with a flash lockout override. The construction and operation of this override feature will now be described. After switch 22 is closed the first time, logic 14 within controller 12 initiates timer 16 by sending a start signal over line 36. The time period of timer 16 could be, for example, one or two seconds, but should be long enough to allow for the user to realize lockout has occurred, decide to override and press the switch again. When the timer has timed out, it resets itself and sends a signal indicating it has timed out to logic 14 over line 38. If switch 22 is closed a second time before timer 16 sends the timeout signal, controller 12 sends a stop/clear signal to timer 16 over line 36 and overrides the flash lockout, sending the fire signal to flash system 18, regardless of the current voltage of flash charger 24, as well as the release signal to shutter system 20. Flash 26 may or may not actually fire, depending on the current voltage of flash charger 24. If flash 26 were a xenon tube and flash charger 24 had reached approximately 200 volts, flash 26 would likely fire, but the light level output thereof may be inadequate for optimum exposure. If switch 22 is not closed a second time before timer 16 times out, the next closure of switch 22 will be treated as a first closure, i.e., the lockout override process will begin again.

One skilled in the art can readily implement the above flash lockout override in, for example, physical logic elements. Controller 12 could be a microprocessor programmed to implement the lockout override as discussed above. Lockout override as described with reference to FIG. 2 could also be implemented with a second switch dedicated to bypassing lockout altogether. This would eliminate the need for the timer. In addition, the overriding means could be separate from controller 12 and, for example, send a disable signal to controller 12 or have independent control over flash system 18 and shutter system 20.

Figure 3:
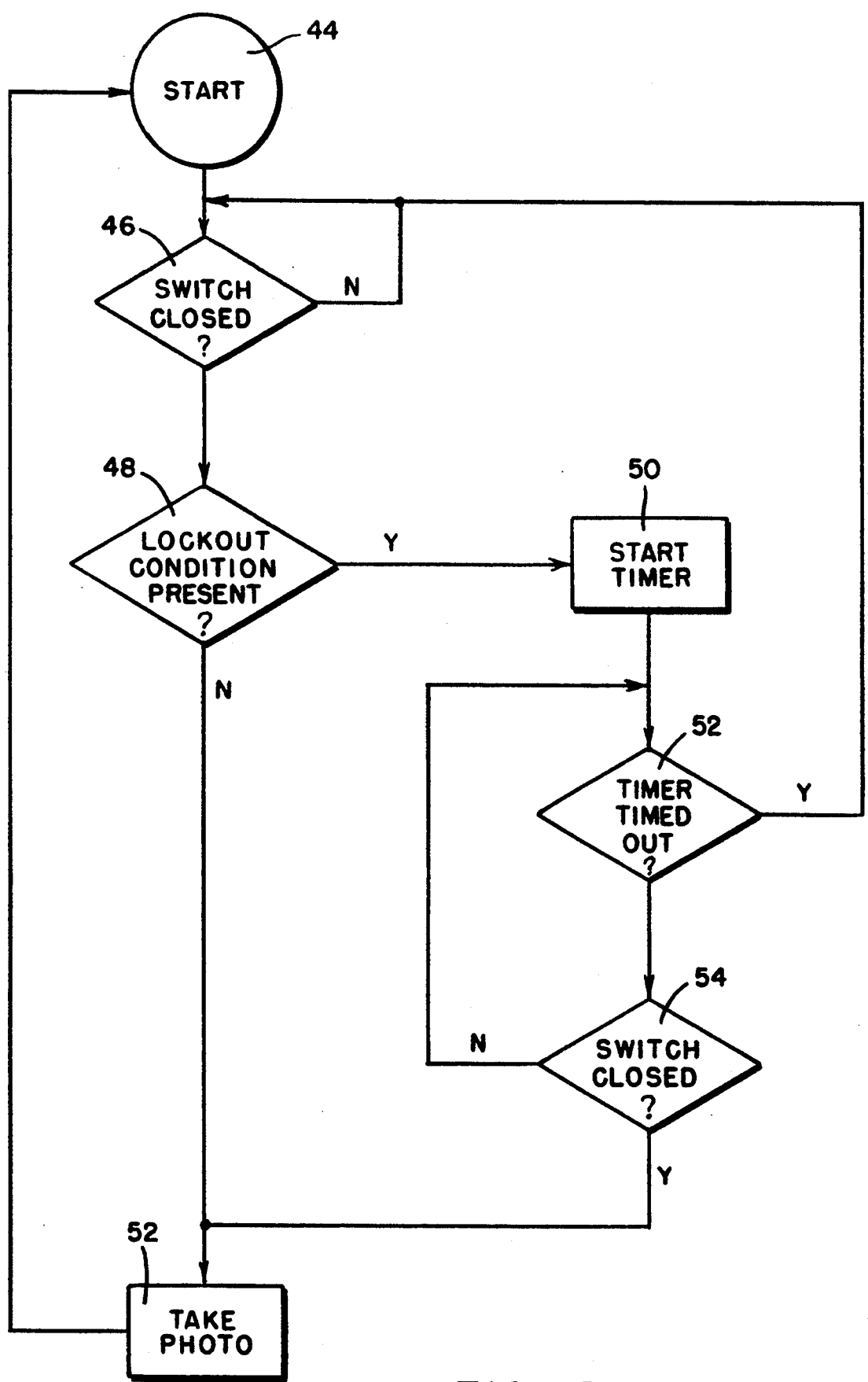
FIG. 3 is a flow diagram of a method of operation of a camera with lockout override capability.

FIG. 3 is a flow diagram of a method for operation of a camera having a lockout feature and a lockout override feature according to the present invention. The method will be described with reference to the camera portion 10 of FIG. 2. However, it will be understood that the method could be applied to other lockout apparatus as well, for example, the auto focus system of FIG. 4. The method begins (step 44) at a point where either the camera has just been turned on or a photo has just been taken. With reference to FIG. 3, this is where flash charger 24 has begun to charge. An initial inquiry 46 is made as to whether switch 22 has been closed. Unless otherwise stated, it is assumed that controller 12 makes all inquiries described herein. If switch 22 has not been closed, indicated by an absence of a signal on line 25, a loop is entered wherein the switch-closing inquiry is repeatedly made. When switch 22 is closed, a second inquiry 48 is made as to whether a given lockout condition is present. In camera portion 10, the lockout condition is a voltage on flash charger 24 below the predetermined minimum voltage desired to ensure optimum exposure. The voltage signal over line 30 provides controller 12 with the answer to the second inquiry. If the lockout condition is present, timer 16 is started, indicated at block 50.

If the lockout condition is not present, i.e., flash charger 24 has reached the predetermined voltage, a photograph is taken (step 52). In FIG. 2, this would mean a fire signal is sent from controller 12 to flash system 18 over line 32, and a release signal is sent to shutter system 20 over line 34.

After timer 16 is started (step 50), a third inquiry 52 is made as to whether the timer has timed out. In FIG. 2, the timeout signal sent from timer 16 over line 38 provides logic 14 with this information. If the timer has timed out, the method returns to starting point 44. If timer 16 has not timed out, a fourth inquiry 54 is made as to whether switch 22 has again been closed. If switch 22 has not been closed again, the timeout inquiry 52 is again made. If switch 22 has been closed again, the steps to take a photo are followed (step 52), regardless of the presence of the lockout condition, i.e., the lockout feature is overridden.

Figure 4:
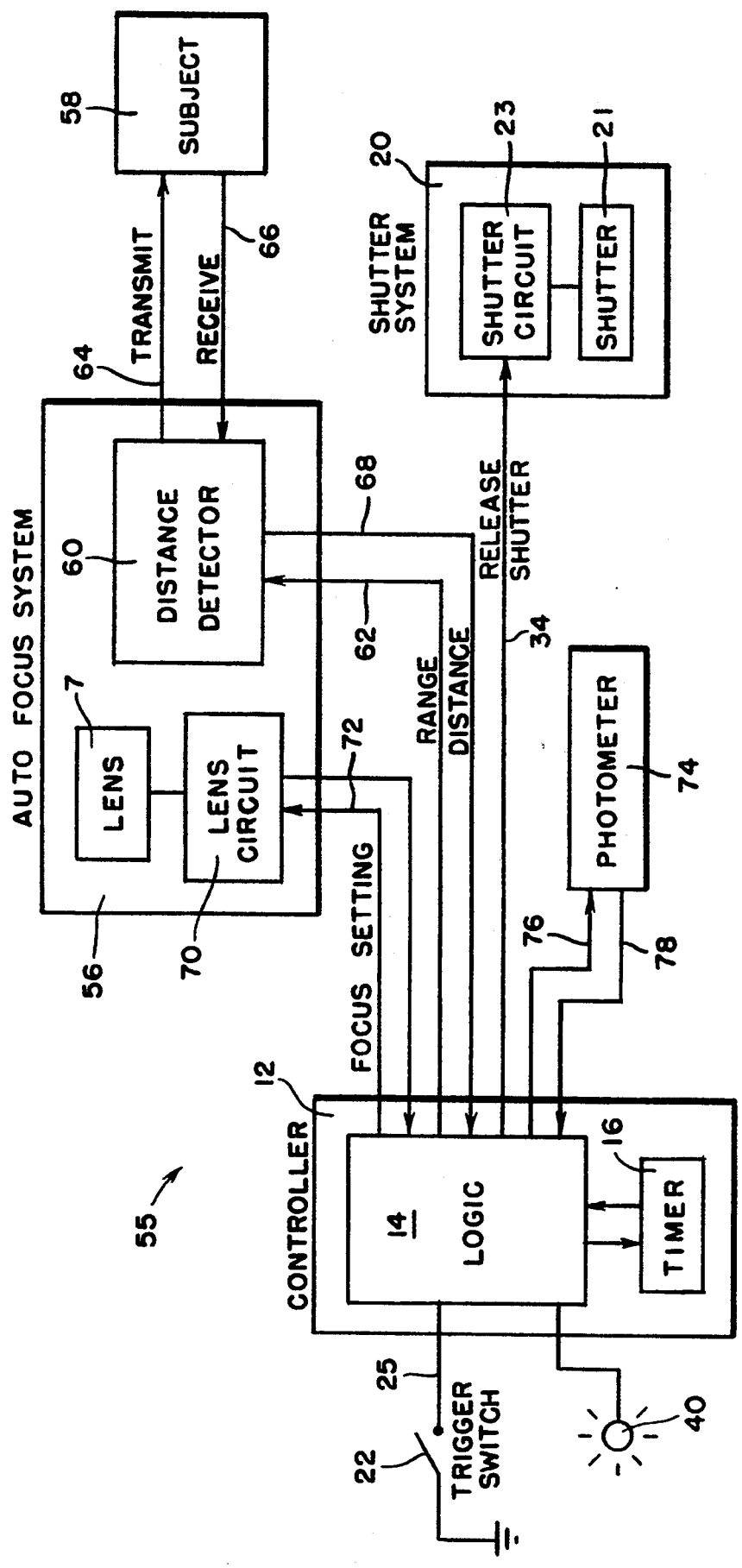
FIG. 4 is a block diagram representation of a portion of the camera of FIG. 1 with focus lockout override capability according to the present invention.

FIG. 4 is a block diagram of a portion 55 of camera 5 providing auto focus capability, auto focus lockout and auto focus lockout override. Switch 22, controller 12, shutter system 20 and photometer 74 of FIG. 2 are employed, along with auto focus system 56 and photographic subject 58. Under normal lockout operation, when switch 22 is closed the first time, controller 12 sends a signal to distance detector 60 over line 62, indicating to the distance detector to determine the distance that subject 58 is from camera 5. Distance detector 60 transmits a ranging signal 64 that bounces off subject 58 and returns as return signal 66. Distance detector 60 discerns the distance of subject 58 from return signal 66. Many methods of distance detection exist; for example, a light strobe could be used. Once the distance has been detected, the information is sent back to controller 12 over line 68. If the distance is within a predetermined focusing range of auto focus system 56, controller 12 will send a signal indicating the proper focus setting to lens circuit 70 over line 72. Lens circuit 70 then focuses lens 7 in accordance with the received signal. At the same time, controller 12 will send a release signal to shutter system 20 over line 34, and shutter circuit 23 causes shutter 21 to release.

If the distance of subject 58 is less than or greater than the predetermined focusing range of auto focus system 56, controller 12 will not send focus and release signals, thereby locking out the attempted photograph (focus lockout). In accordance with a focus lockout override feature of the present invention, when switch 22 is closed the first time, controller 12 starts timer 16 as in the description of FIG. 2. If switch 22 is closed a second time before timer 16 times out, controller 12 will override the focus lockout. If subject 58 is beyond the maximum distance range of auto focus system 56, controller 12 will indicate to lens circuit 70 to focus lens 7 at the maximum focus setting. If subject 58 is closer than the minimum distance range of auto focus system 56, controller 12 will indicate to lens circuit 70 to focus lens 7 at the minimum focus setting. After lens 7 has been focused, shutter 21 will be released and the photo will be taken, even though it will likely be out of focus to some degree.

It will be understood that controller 12 could delay release of shutter 21 until lens 7 has been focused, or switch 22 could be a two stage switch. At the first stage, the auto focus system is operated, and as the user closes the switch to the second stage, the lens has focused and the shutter will release. If a single stage switch, such as switch 22, is used, controller 12 would wait for a signal from lens circuit 70 over line 73 indicating that lens 7 has been focused. As with the description of flash lockout override, one skilled in the art could readily implement auto focus lockout override according to the present invention, for example, using an appropriately programmed microprocessor. Also, as with flash lockout override, optional lockout indicator 40 could be included.

In both flash lockout override and focus lockout override, the lockout feature need not be completely overridable. Where there is not enough light to expose the film without the flash, it is still desirable to lock out a photo even when lockout override is attempted. Photometer 74, which measures ambient light level, can be utilized by controller 12 to decide if even a poor quality photo is possible. Prior to initiating override, controller 12 would send a signal over line 76 indicating to photometer 74 to take a light level reading. Photometer 74 would respond with the light level reading results over line 78. If the light level were below a predetermined level, controller 12 would not override the lockout, since to do so would not result in even minimum exposure of the film.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

I claim:
1. A camera, comprising:
an electronic shutter mechanism including a shutter;
means for initiating release of said shutter;
a controller for controlling release of said shutter;
means for detecting and indicating to said controller that a lockout condition is present, wherein a first activation of said initiating means causes said controller to lockout said release of said shutter when said lockout condition is present; and
means for overriding said lockout for a predetermined time following said first activation wherein a second activation of said initiating means causes said controller to enable release of said shutter.

2. A camera according to claim 1, further comprising an electronic flash system including a flash and a flash charger; and wherein: said initiating means comprises means for initiating attempted firing of said flash, said controller also controlling said electronic flash system, and said first activation of said initiating means also causing said controller to lockout firing of said flash when a flash lockout condition is present, said flash lockout condition occurring when the flash charger is charged to a voltage below a predetermined voltage level, and wherein said overriding means comprises means for overriding said flash lockout.

3. A camera according to claim 2, wherein said initiating means comprises a shutter-release/flash-firing switch located on an outer portion of said camera, and wherein said first activation comprises a first closure of said shutter-release/flash-firing switch.

4. A camera according to claim 2 further including means for measuring ambient light level, and wherein said overriding means comprises means for overriding said flash lockout when said measured ambient light level is at or above a predetermined ambient light level.

5. A camera according to claim 2, wherein said means for overriding said flash lockout comprises means for overriding said flash lockout in response to a second activation of said initiating means within a predetermined time period from said first activation thereof.

6. A camera according to claim 3, wherein said means for overriding said flash lockout comprises means for overriding said flash lockout in response to a second closure of said shutter-release/flash-firing switch within a predetermined time period from said first closure thereof.

7. A camera according to claim 1, further comprising an electronic auto focus mechanism including a lens and distance detection means for generating a distance signal indicating a distance of a photographic subject from said camera; and wherein: said initiating means comprises means for initiating focusing of said lens, said controller also controlling said electronic auto focus mechanism, and said first activation of said initiating means also causing said controller to lockout generation of said distance signal and focusing of said lens based on said distance signal when a focus lockout condition is present, said focus lockout condition occurring when said photographic subject is outside a predetermined range of said lens, and wherein said overriding means comprises means for overriding said focus lockout.

8. A camera according to claim 7, wherein said initiating means comprises an auto-focus/shutter-release switch, and wherein said first activation comprises a first closure of said auto-focus/shutter-release switch.

9. A camera according to claim 7 wherein said overriding means comprises means for overriding said focus lockout in response to a second activation of said initiating means within a predetermined time period from said first activation thereof.

10. A camera according to claim 8 wherein said overriding means comprises means for overriding said focus lockout in response to a second closure of said auto-focus/shutter-release switch within a predetermined time period from said first closure thereof.

11. A camera according to claim 7 further comprising means for measuring ambient light level, wherein said overriding means comprises means for overriding said focus lockout when said measured ambient light level is at or above a predetermined ambient light level.

12. A camera according to claim 1, wherein said detecting and indicating means comprises means for measuring ambient light level, wherein said lockout condition is a measured ambient light level below a predetermined ambient light level (light lockout) and wherein said overriding means comprises means for overriding said light lockout.

13. A camera according to claim 12 wherein said means for measuring ambient light level comprises a photometer.

14. A camera according to claim 1 further comprising means for indicating to a user that said lockout has occurred.

15. A method for overriding lockout in a camera having an electronic shutter mechanism including a shutter, a shutter-release switch and a controller for controlling release of said shutter, wherein upon closing said switch a first time said controller locks out said release of said shutter when a lockout condition is present, said method comprising the steps of:

closing said switch a second time within a predetermined time period after said first time: and controller releasing of said shutter in response to said switch closing said second time, whereby said lockout is overridden.

16. The method of claim 15 further comprising the step of indicating to a user that said lockout has occurred just prior to said step of closing said switch said second time.

17. The method of claim 16, wherein said camera further includes a light emitting diode for indicating to a user that said lockout has occurred, and wherein said step of indicating comprises activating said light emitting diode.

18. A method for overriding flash lockout with a camera having an electronic flash system including a flash and a flash charger, an electronic shutter system having a shutter, a shutter-release/flash-firing switch and a controller for controlling said electronic flash system and said electronic shutter system, wherein said controller locks out said flash and said shutter in response to closing said switch a first time when said flash charger is charged to a voltage below a predetermined voltage required for taking a flash photograph, said method comprising the steps of:

closing said switch a second time within a predetermined time period after said first time; and controller releasing of said shutter and attempting to fire said flash in response to said switch closing said second time, whereby said flash lockout is overridden.

19. The method of claim 18 wherein said step of releasing comprises releasing said shutter and attempting to fire said flash only if said flash charger has charged to at least a predetermined minimum voltage required by said flash for firing.

20. The method of claim 18, wherein said camera further includes means for measuring ambient light level, and wherein said step of releasing comprises releasing said shutter and attempting to fire said flash only if at least a predetermined minimum ambient light level is measured.

21. A method for overriding focus lockout with a camera having an electronic auto focus mechanism including a lens, an electronic shutter mechanism including a shutter, an auto-focus/shutter-release switch and a controller for controlling said electronic auto focus mechanism and said electronic shutter mechanism, wherein a photographic subject is outside a predetermined range of said lens, and wherein upon closing said switch a first time said controller locks out focusing of said lens and release of said shutter, said method comprising the steps of:

closing said switch a second time within a predetermined time period after said first time;

controller focusing of said lens at a maximum or minimum focus setting in response to closing said switch said second time, depending on positioning of said photographic subject; and controller releasing of said shutter after focusing, whereby said focus lockout is overridden.

22. The method of claim 21, wherein said camera further includes means for measuring ambient light level, and wherein said step of focusing and said step of releasing are performed only if at least a predetermined minimum ambient light level is measured.

* * * * *